(No Model.)
J. M. DODGE.
CONVEYER.
No. 499,527. Patented June 13, 1893.
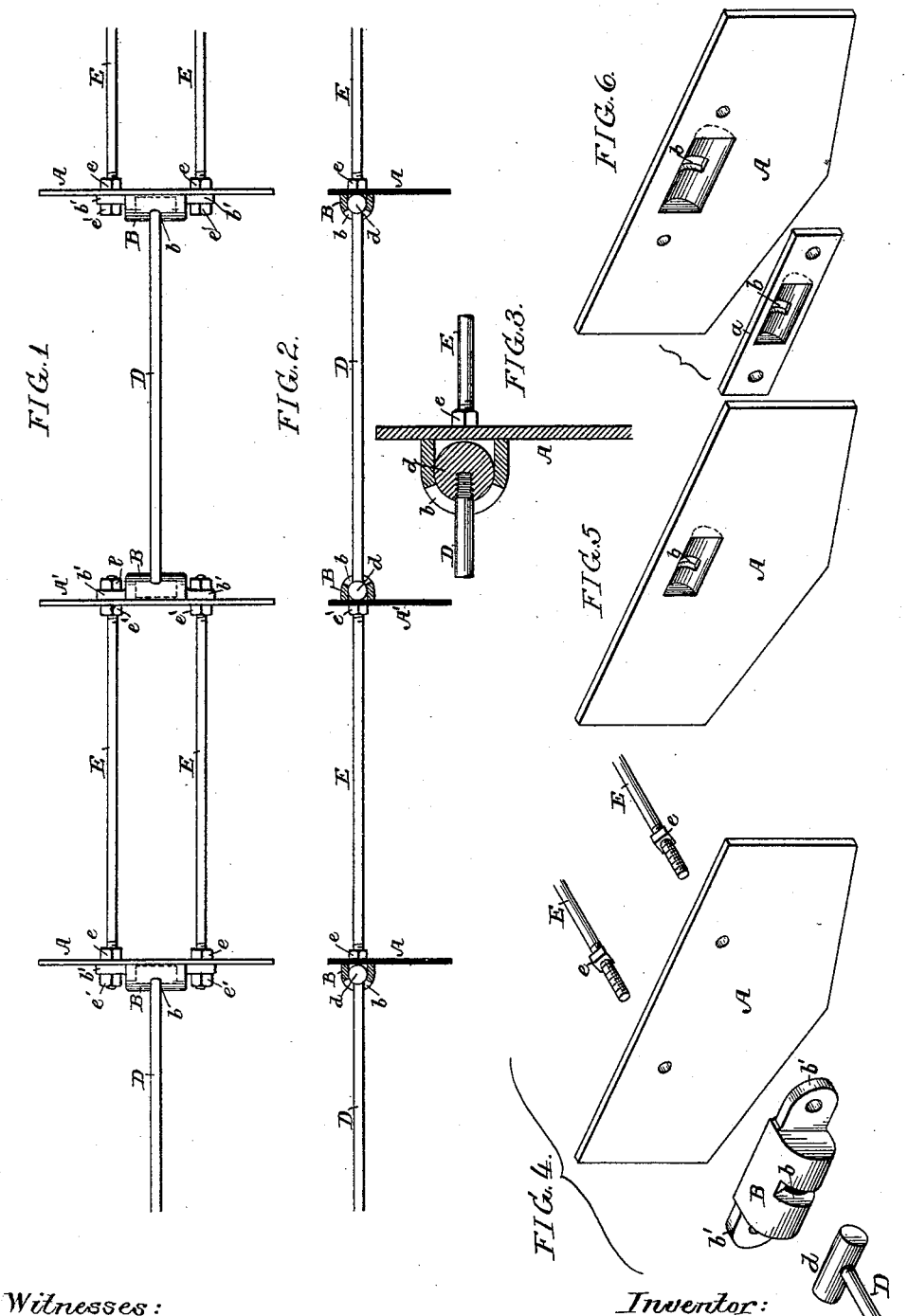
Witnesses:
R Schleicher
Alex Barkoff
Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE LINK-BELT ENGINEERING COMPANY, OF SAME PLACE.

CONVEYER.

SPECIFICATION forming part of Letters Patent No. 499,527, dated June 13, 1893.

Application filed January 26, 1893. Serial No. 459,845. (No model.)

*To all whom it may concern:*

Be it known that I, JAMES M. DODGE, a citizen of the United States, and a resident of Philadelphia, Pennsylvania, have invented certain Improvements in Conveyers, of which the following is a specification.

The object of my invention is to construct a conveyer of a series of rods and bolts secured together and to flights in such a manner that the flights will run together in pairs, the flights of each pair being rigidly secured together.

In the accompanying drawings:—Figure 1, is a plan view of my improved conveyer. Fig. 2, is a side view showing the flights in section. Fig. 3, is an enlarged sectional view. Fig. 4, is a detached perspective view. Fig. 5, is a view showing the socket for the head of the rod formed in the flight itself; and Fig. 6, is a detached perspective view showing the socket set into the flights.

A are the flights preferably made of sheet metal and of the shape shown in Fig. 4, but they may be circular or of any shape desired, the shape depending greatly upon the character of the work, and the form of the trough within which the conveyer acts. In some instances, the flights may be in the form of buckets for carrying the material, dispensing with the troughs.

On one side of the flight A is a socket B recessed from the back, and having a slot $b$ extending into the said recess, as clearly shown in Figs. 3 and 4. Adapted to this recess or pocket is a cylindrical head $d$ of a rod D. This rod extends from one flight to the other, and is provided at each end with a head, as clearly shown in Figs. 1 and 2. The rod is passed through the slot $b$ in each socket, and is preferably screwed into the heads $d$ as shown in Fig. 3, but the rods may be otherwise secured to the heads without departing from my invention. The slots $b$ are of sufficient length to allow the rods free vertical movement in respect to the flights.

Extending from one flight A to a flight A' are bolts E, two in the present instance. These bolts are preferably threaded at each end and have nuts $e$ bearing against one face of each flight, and nuts $e'$ bearing against ears $b'$ of the sockets B. The bolts pass through holes in the flights, and in the ears of the sockets as clearly shown in Fig. 4. Thus it will be seen that the bolts not only secure the flights together, but also firmly attach the sockets to the flights, so that as soon as the nuts $e'$ are removed from the bolts the parts are readily detached for repairs or adjustment. Thus the flights are arranged in pairs the bolts alternating with the rods in the length of the conveyer, and in that the necessary movement is at the junction of the flights with the rods, as the bolts rigidly connect one flight with the other. In some instances the sockets may be formed directly in the flights by striking up the flight as shown in Fig. 5, the tension on the conveyer when running being sufficient to keep the heads in the socket, and in Fig. 6 I have shown a bearing plate $a$ adapted to the socket, and this plate can be removed when worn, and a new plate substituted therefor. In some instances, a plate may be placed on the outside to strengthen the flight if necessary.

I claim as my invention—

1. A conveyer consisting of a series of bolts, and a series of rods connected together by sockets which are rigidly secured to the bolts, substantially as described.

2. The combination of the flights having sockets, headed rods adapted to the sockets, and bolts extending from one flight to another, and rigidly secured to said flights, substantially as described.

3. The combination of the flights, sockets rigidly attached thereto, headed rods adapted to said sockets, with bolts extending from one flight to another and alternating with the rods, substantially as described.

4. The combination of the flights, the sockets mounted thereon, heads adapted to said sockets, rods secured to said heads, with bolts extending from one flight to another securing the two flights rigidly together, and securing the sockets to the flights, substantially as described.

5. The combination of the flights, sockets thereon, holes in the flights and in the sockets, screw threaded bolts extending from one flight to another and extending through the holes in the flights and sockets, nuts bearing against one side of the flights, and nuts bearing against the sockets so as to securely fasten the flights and sockets together, and to the bolts, with rods having heads adapted to the sockets, substantially as described.

In testimony whereof I have signed my name to this specification in the presence of two subscribing witnesses.

JAMES M. DODGE.

Witnesses:
HENRY HOWSON,
JOSEPH H. KLEIN.